US012718539B2

(12) United States Patent
Choudhary et al.

(10) Patent No.: US 12,718,539 B2
(45) Date of Patent: Aug. 25, 2026

(54) MULTI-MODAL UNDERSTANDING OF EMOTIONS IN VIDEO CONTENT

(71) Applicant: Samsung Electronics Co., Ltd., Suwon-si (KR)

(72) Inventors: Divya Choudhary, Santa Clara, CA (US); Palash Goyal, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 18/057,643

(22) Filed: Nov. 21, 2022

(65) Prior Publication Data

US 2024/0169711 A1 May 23, 2024

(51) Int. Cl.
*G06K 9/00* (2022.01)
*G06V 10/80* (2022.01)
*G06V 40/16* (2022.01)

(52) U.S. Cl.
CPC ............ *G06V 10/80* (2022.01); *G06V 40/168* (2022.01); *G06V 40/174* (2022.01)

(58) Field of Classification Search
CPC .................................. G06K 9/00; G06F 18/00
USPC ........ 382/100, 103, 107, 115, 117–118, 154, 382/156, 157, 162, 168, 173, 181, 189, 382/199, 216, 219, 224, 232, 254, 276, 382/286–291, 305, 318; 351/206
See application file for complete search history.

(56) References Cited

U.S. PATENT DOCUMENTS 7,242,810 B2 7/2007 Chang
11,238,289 B1 2/2022 Tao et al.
11,282,297 B2 3/2022 Zeng et al.
11,375,256 B1 6/2022 Dorner
11,386,712 B2 7/2022 Yadav et al.
2019/0341025 A1* 11/2019 Omote .................... G10L 25/30
(Continued)

FOREIGN PATENT DOCUMENTS

CN 111164601 A 5/2020
CN 111563422 A 8/2020
(Continued)

OTHER PUBLICATIONS

Complex Emotion Recognition via Facial Expressions with Label Noises Self-Cure Relation Networks Xiaoqing Wang , 1,2 Yaocheng Wang , (Year: 2023).*
(Continued)

*Primary Examiner* — Seyed H Azarian

(57) ABSTRACT

A method includes obtaining a video sequence having multiple video frames and audio data. The method also includes extracting video features associated with at least one face in the video frames and audio features associated with the audio data. The method further includes processing the video features and the audio features using a trained machine learning model. The trained machine learning model performs a multi-tiered fusion of the video features and different subsets of the audio features in order to identify at least one emotion expressed by at least one person in the video sequence. The multi-tiered fusion of the video features and the audio features may include (i) a first fusion of the video features and a first subset of the audio features and (ii) a second fusion of processed features and a second subset of the audio features, where the processed features are based on the first fusion.

20 Claims, 6 Drawing Sheets

(56) References Cited

U.S. PATENT DOCUMENTS

| | | | | |
|---|---|---|---|---|
| 2020/0279156 | A1* | 9/2020 | Cai | G06V 10/764 |
| 2021/0151034 | A1* | 5/2021 | Hasan | G06F 40/30 |
| 2021/0264921 | A1 | 8/2021 | Reece et al. | |
| 2022/0138472 | A1 | 5/2022 | Mittal et al. | |
| 2022/0270636 | A1* | 8/2022 | Tao | G10L 25/63 |
| 2023/0154172 | A1* | 5/2023 | Wasnik | G06F 40/30 382/157 |
| 2024/0257554 | A1* | 8/2024 | Xu | G06N 3/084 |
| 2025/0078569 | A1* | 3/2025 | Zhang | G06V 10/809 |

FOREIGN PATENT DOCUMENTS

| | | | |
|---|---|---|---|
| CN | 112699774 | A | 4/2021 |
| EP | 3942552 | A1 | 1/2022 |

OTHER PUBLICATIONS

Chen et al., "Self-Cure Network with Two-Stage Method for Facial Expression Recognition," 2021 27th International Conference on Mechatronics and Machine Vision in Practice, Jan. 2022, 6 pages. EFS Web 2.1.18 (Year: 2022).*

International Search Report and Written Opinion of the International Searching Authority dated Oct. 19, 2023 in connection with International Patent Application No. PCT/KR2023/009600, 10 pages.

Zhao et al., "An End-to-End Visual-Audio Attention Network for Emotion Recognition in User-Generated Videos," AAAI 2020, Feb. 2020, 9 pages.

Chen et al., "Emotion Recognition with Audio, Video, EEG, and EMG: A Dataset and Baseline Approaches," Digital Object Identifier 10.1109, Jan. 2022, 14 pages.

Schoneveld et al., "Leveraging Recent Advances in Deep Learning for Audio-Visual Emotion Recognition," Elsevier, Pattern Recognition Letters, Sep. 2021, 8 pages.

Ma et al., "Acceleration of multi-task cascaded convolutional networks," The Institute of Engineering and Technology Journals, Image Processing, Jul. 2020, 7 pages.

Chen et al., "Self-Cure Network with Two-Stage Method for Facial Expression Recognition," 2021 27th International Conference on Mechatronics and Machine Vision in Practice, Jan. 2022, 6 pages.

Riggs, "Creating Audio Features with PyAudio Analysis," Dolbyio Blog, Dec. 2021, 11 pages.

Gong et al., "PSLA: Improving Audio Tagging with Pretraining, Sampling, Labeling, and Aggregation," IEEE/ACM Transactions on Audio, Speech, And Language Processing, Nov. 2021, 15 pages.

Vaswani et al., "Attention Is All You Need," 31st Conference on Neural Information Processing Systems (NIPS 2017), Dec. 2017, 15 pages.

Wang et al., "Distilled Dual-Encoder Model for Vision-Language Understanding," https://arxiv.org/abs/2112.08723, Oct. 2022, 12 pages.

Li et al., "Pre-training Model Based on Parallel Cross-Modality Fusion Layer," PLoS ONE 17(2), Feb. 2022, 14 pages.

Supplementary European Search Report dated Aug. 18, 2025 in connection with European Patent Application No. 23894708.9, 9 pages.

Zhou et al., "Information Fusion in Attention Networks Using Adaptive and Multi-Level Factorized Bilinear Pooling for Audio-Visual Emotion Recognition," IEEE/ACM Transactions on Audio, Speech, And Language Processing, Nov. 2021, 14 pages.

Wang et al., "Unlocking the Emotional World of Visual Media: An Overview of the Science, Research, and Impact of Understanding Emotion," Proceedings of the IEEE, Jul. 2023, 49 pages.

Ortega et al., "Emotion Recognition Using Fusion of Audio and Video Features," Jun. 2019, 6 pages.

Wang et al., "A systematic review on affective computing: emotion models, databases, and recent advances," Mar. 2022, 48 pages.

* cited by examiner

MULTI-MODAL UNDERSTANDING OF EMOTIONS IN VIDEO CONTENT

TECHNICAL FIELD

This disclosure relates generally to machine learning systems. More specifically, this disclosure relates to multi-modal understanding of emotions in video content.

BACKGROUND

The ability to accurately identify a broad spectrum of emotions contained in video content may be useful in various applications, but current approaches for identifying emotions contained in video content suffer from a number of shortcomings. For example, these approaches are typically restricted to identifying a small number of core emotions (such as anger, disgust, fear, happiness, sadness, and surprise), which can limit the effectiveness of these approaches. Also, these approaches typically use a single modality of information, such as just the audio data associated with video content, to identify emotions in the video content. As a result, these approaches often produce inaccurate results. As a particular example, crowd noises in a stadium during a sporting event may typically be classified as being associated with the positive emotion of "joy." However, the actual emotion of the stadium crowd may be "excited" (such as during a particular period of play) or "sad" (such as in response to a failed play or attempt by a particular team).

SUMMARY

This disclosure relates to multi-modal understanding of emotions in video content.

In a first embodiment, a method includes obtaining a video sequence having multiple video frames and audio data. The method also includes extracting video features associated with at least one face in the video frames and audio features associated with the audio data. The method further includes processing the video features and the audio features using a trained machine learning model. The trained machine learning model performs a multi-tiered fusion of the video features and different subsets of the audio features in order to identify at least one emotion expressed by at least one person in the video sequence.

In a second embodiment, an electronic device includes at least one memory configured to store a video sequence having multiple video frames and audio data. The electronic device also includes at least one processing device configured to extract video features associated with at least one face in the video frames and audio features associated with the audio data and to process the video features and the audio features using a trained machine learning model. The trained machine learning model is configured to perform a multi-tiered fusion of the video features and different subsets of the audio features in order to identify at least one emotion expressed by at least one person in the video sequence.

In a third embodiment, a non-transitory computer readable medium contains instructions that when executed cause at least one processor to obtain a video sequence having multiple video frames and audio data. The non-transitory computer readable medium also contains instructions that when executed cause the at least one processor to extract video features associated with at least one face in the video frames and audio features associated with the audio data. The non-transitory computer readable medium further contains instructions that when executed cause the at least one processor to process the video features and the audio features using a trained machine learning model. The trained machine learning model is configured to perform a multi-tiered fusion of the video features and different subsets of the audio features in order to identify at least one emotion expressed by at least one person in the video sequence.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
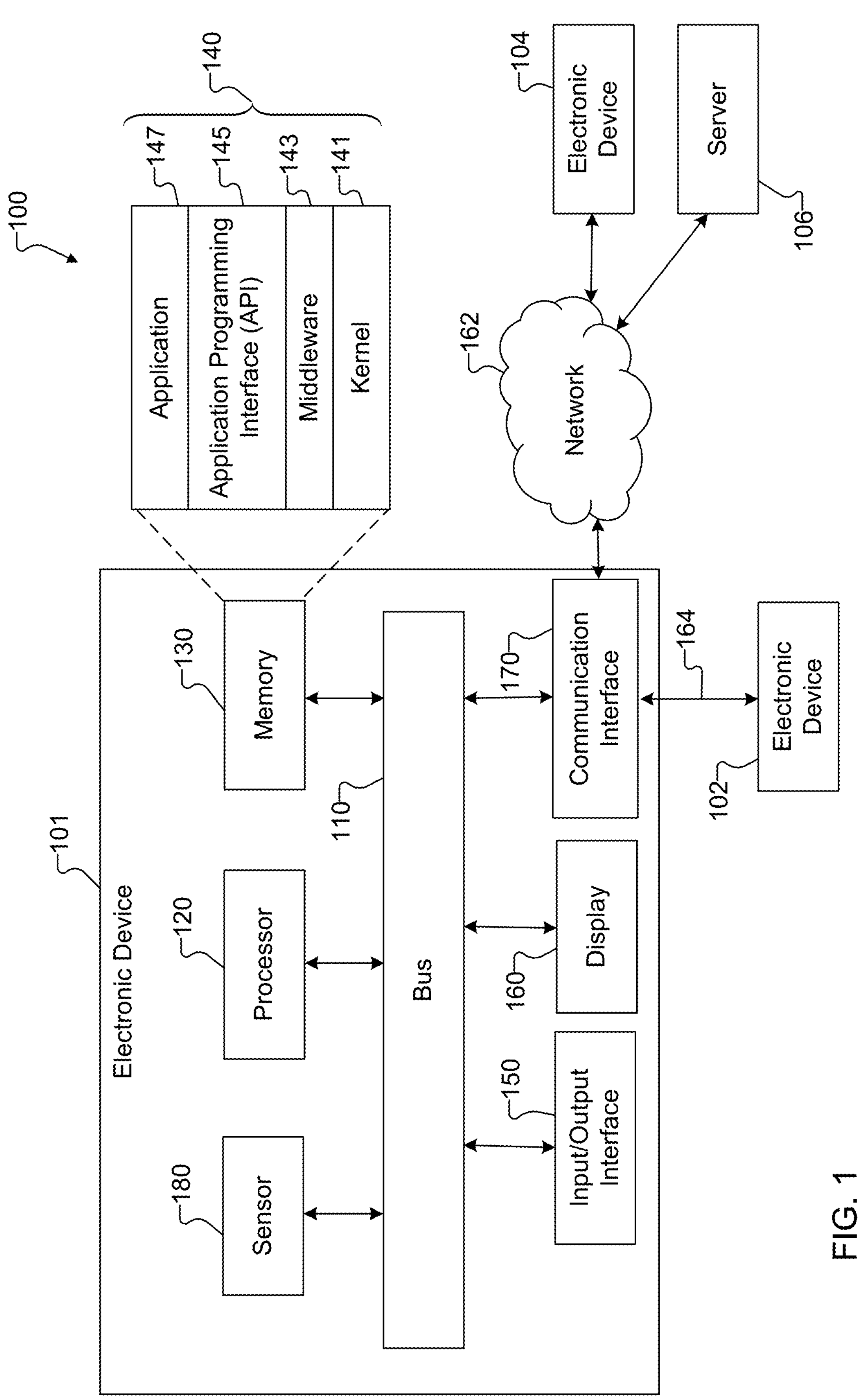
FIG. 1 illustrates an example network configuration including an electronic device in accordance with this disclosure.

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, the ability to accurately identify a broad spectrum of emotions contained in video content may be useful in various applications, but current approaches for identifying emotions contained in video content suffer from a number of shortcomings. For example, these approaches are typically restricted to identifying a small number of core emotions (such as anger, disgust, fear, happiness, sadness, and surprise), which can limit the effectiveness of these approaches. Also, these approaches typically use a single modality of information, such as just the audio data associated with video content, to identify emotions in the video content. As a result, these approaches often produce inaccurate results. As a particular example, crowd noises in a stadium during a sporting event may typically be classified as being associated with the positive emotion of "joy." However, the actual emotion of the stadium crowd may be "excited" (such as during a particular period of play) or "sad" (such as in response to a failed play by a particular team).

This disclosure provides techniques for multi-modal understanding of emotions in video content. As described in more detail below, a video sequence can be obtained, where the video sequence includes (i) multiple video frames and (ii) audio data. At least some of the video frames in the video sequence can capture at least one person's face. Video features associated with the at least one face in the video frames are extracted, and audio features associated with the audio data are extracted. In some cases, the video features may be extracted by splitting the video frames into multiple collections, performing face detection using the collections, and processing the collections based on the face detection results to identify the video features associated with the at least one face. Also, in some cases, the audio features may be extracted by processing the audio data to identify a first subset of audio features (such as features associated with the raw audio waveforms of the audio data) and a second subset of audio features (such as features determined using a pre-trained audio model and based on the audio data).

The video features and audio features are provided to and processed using a trained machine learning model, where the trained machine learning model performs (among other things) a multi-tiered fusion of the video features and different subsets of the audio features to identify at least one emotion expressed by at least one person in the video sequence. For instance, the trained machine learning model may perform (i) a first fusion of the video features and a first subset of the audio features and (ii) a second fusion of processed features and a second subset of the audio features, where the processed features are based on the first fusion. In some cases, the trained machine learning model may include (i) at least one cross-modal transformer encoder layer that receives and fuses the video features and the first subset of audio features and generates multi-modal features, (ii) at least one fusion encoder layer that combines the multi-modal features, and (iii) a multi-layer perceptron decoder layer that decodes outputs of the fusion encoder layer(s) as fused with the second subset of audio features.

In this way, the described techniques enable more effective identification of human emotions contained in video content. Among other things, the described techniques support the use of multiple modalities, since the machine learning model can process features associated with both the video data and the audio data of the video content. Human emotions in video content can be better inferred based on the efficient fusion of information from the multiple modalities present in the video content (such as audio and faces), and the machine learning model can be effectively trained to utilize both audio and visual modalities to recognize emotions in the video content. Also, the described techniques may support a larger or more exhaustive taxonomy of human emotions, which allows for the detection of subtler emotions in the video content. As a particular example, in video content showing a sporting event, the described techniques may detect emotions such as positive joy (generally) or positive joy (excitement) when a crowd is expecting a score or negative shock or surprise (generally) when a player faces an injury (rather than just "happy" or "sad"). In addition, the machine learning model can be trained using a large emotion video dataset, which can incorporate a broad spectrum of hierarchical emotion annotations along with modality. This helps to improve the training of the machine learning model and improve the overall accuracy of the machine learning model.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to process video sequences using feature extractors and a multi-modal machine learning model in order to identify emotions of one or more people in each of the video sequences. The processor 120 may also or alternatively be used to perform or initiate performance of one or more actions based on or in response to at least one emotion identified in at least one video sequence.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for supporting or using multi-modal understanding of emotions in video content. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to process video sequences using feature extractors and a multi-modal machine learning model in order to identify emotions of one or more people in each of the video sequences. The server 106 may also or alternatively be used to perform or initiate performance of one or more actions based on or in response to at least one emotion identified in at least one video sequence.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
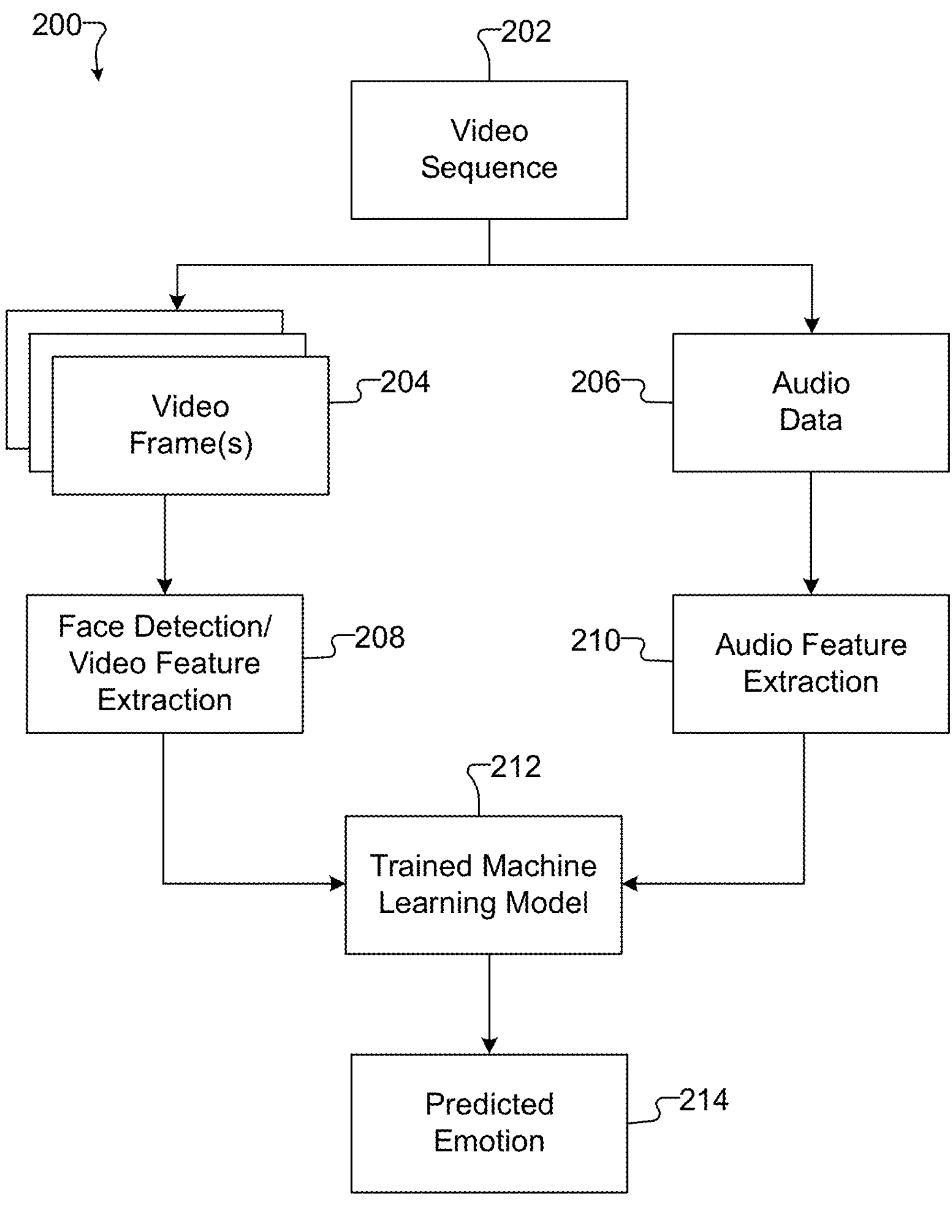
FIG. 2 illustrates an example architecture supporting multi-modal understanding of emotions in video content in accordance with this disclosure.

FIG. 2 illustrates an example architecture 200 supporting multi-modal understanding of emotions in video content in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes video sequences 202. Each video sequence 202 includes multiple video frames 204 and audio data 206. Each video sequence 202 may be obtained from any suitable source(s). In some cases, for instance, each video sequence 202 may represent video content that is provided to the electronic device 101 from the server 106 or other source(s) for presentation to one or more viewers by the electronic device 101. The video sequences 202 may represent any suitable video content, such as movies, television shows, home videos, long or short video clips available for download or viewing over the Internet, or any other suitable video content. Each video sequence 202 may have any suitable length, possibly ranging from relatively short video clips to lengthy movies or other videos.

Each video frame 204 represents one of the images contained in a sequence of images in an associated video sequence 202. Each video frame 204 may have any suitable format and resolution, possibly up to and including 4K or 8K resolution or even higher. At least some of the video frames 204 in each video sequence 202 capture one or more faces of one or more people. The audio data 206 represents audio waveforms that can be reproduced during presentation of the associated video sequence 202 to provide audible sounds to one or more viewers. For instance, the audio data 206 may include one or more voices of one or more people talking, cheering, or otherwise producing sounds in the associated video sequence 202, music or sound effects in the associated video sequence 202, or sounds in the scene(s) captured in the associated video sequence 202. The audio data 206 may have any suitable format and any suitable resolution, possibly up to and including 24-bit or 32-bit resolution or even higher. The audio data 206 may also have any suitable data rates, possibly up to and including 256 kbit/sec or even higher.

In this example, the video frames 204 of each video sequence 202 can be provided to and processed using a face detection and video feature extraction function 208. The face detection and video feature extraction function 208 generally operates to identify the positions of one or more people's faces in the video frames 204 and to extract or otherwise identify features of the video frames 204. The identified features of the video frames 204 include (at a minimum) features related to the identified face(s) within the video frames 204, meaning the identified features of the video frames 204 include facial features of the one or more people captured in the video frames 204. In some cases, the face detection and video feature extraction function 208 may process the video frames 204 individually. In other cases, the face detection and video feature extraction function 208 may process collections of the video frames 204, such as when the video frames 204 are grouped into collections of relatively short duration (such as collections that are each about six seconds in length).

The face detection and video feature extraction function 208 may use any suitable technique(s) to perform face detection and to extract facial features or other video features of video frames 204 in one or more video sequences 202. In some embodiments, the face detection and video feature extraction function 208 may be implemented using one or more machine learning models that have been trained to perform face detection and video feature extraction. As a particular example, the face detection portion of the function 208 may be implemented using a multi-task cascaded convolutional network (MTCNN), and the video feature extraction portion of the function 208 may be implemented using a self-cure network (SCN). The MTCNN or other machine learning model may be used to support both face detection (which involves identifying locations of faces in video frames 204) and facial landmark alignment (which involves identifying locations of people's eyes, noses, mouths, or other facial landmarks in the video frames 204). The SCN or other machine learning model may be used to identify features associated with people's facial expressions in video frames 204. In particular embodiments, the SCN includes five frozen layers and supports up to 512 classes related to facial features.

In this example, the audio data 206 of each video sequence 202 can be provided to and processed using at least one audio feature extraction function 210. The audio feature extraction function 210 generally operates to identify multiple subsets of audio features related to the audio data 206. For example, the audio feature extraction function 210 can identify a first subset of audio features of the audio data 206, where these features may include general features based on the raw audio waveforms of the audio data 206. Specific examples of features that may be used in the first subset of audio features could include energy-related, spectral-related, or other features of the audio data 206. The audio feature extraction function 210 can also identify a second subset of audio features of the audio data 206, where these features may be generated using a pre-trained audio model and be based on the audio data 206.

The audio feature extraction function 210 may use any suitable technique(s) to extract audio features of audio data 206 in one or more video sequences 202. In some embodiments, the audio feature extraction function 210 may be at least partially implemented using one or more machine learning models that have been trained to perform audio feature extraction. As a particular example, the audio feature extraction function 210 may be implemented using PyAudio analysis to identify the first subset of audio features for each instance of the audio data 206 and a pretraining, sampling, labeling, and aggregation (PSLA) model to identify the second subset of audio features for each instance of the audio data 206. In particular embodiments, the PSLA model may be implemented using an EfficientNet B2 pre-trained model with four attention heads.

The extracted video features and the extracted audio features for each video sequence 202 are provided to a trained machine learning model 212, which generally operates to process the extracted features and generate one or more predicted emotions 214 expressed by at least one person in each video sequence 202. For example, the trained machine learning model 212 can be trained to perform a multi-tiered fusion of the video features and the different subsets of the audio features during the identification of the one or more predicted emotions 214 expressed by the at least one person in each video sequence 202. The trained machine learning model 212 may have any suitable machine learning-based structure that is configured to process video and audio features and estimate emotions contained in video content. In some embodiments, the trained machine learning model 212 may be implemented using an attention-based transformer architecture, which can be used to support a multi-modal feature fusion technique. In particular embodiments, the trained machine learning model 212 may be implemented using a single-layer transformer with four attention heads for audio and eight attention heads for video. Example implementations of the trained machine learning model 212 are described below with respect to FIGS. 3 through 5.

The machine learning model 212 here can be trained to effectively recognize human emotions in video content using both audio and visual modalities present in the video content. As described below, unimodal features (namely the video/facial features and the first subset of audio features) for each video sequence 202 can be fused, such as via concatenation or other suitable fusion technique, and processed using one or more cross-modal transformer encoder layers and one or more fusion encoder layers of a multi-modal transformer in the machine learning model 212. Final outputs of the multi-modal transformer are subsequently fused with other audio features (namely the second subset of audio features) for each video sequence 202, and the fused features are processed using a decoder of the trained machine learning model 212 to produce the one or more predicted emotions 214 for each video sequence 202.

The machine learning model 212 can be trained in any suitable manner. For example, in some cases, training data and ground truth data can be obtained, where (i) the training data may include video sequences 202 containing various people's faces showing various emotions and (ii) the ground truth data may include correct outputs to be generated by the machine learning model 212 using the video sequences 202 of the training data. The training data can be provided to the face detection and video feature extraction function 208 and the audio feature extraction function 210 in order to extract the video and audio features from the video sequences 202 in the training data. The video and audio features can be provided to the machine learning model 212, and the machine learning model 212 can be used to generate predicted emotions 214 for the video sequences 202 in the training data. The predicted emotions 214 can be compared to the ground truth data, and differences or errors between the predicted emotions 214 and the ground truth data can be identified and used to calculate an overall error or loss for the machine learning model 212. Any suitable loss function may be used here to calculate the loss, such as a focal loss with a learning rate of 0.0001 and a dropout rate of 0.2. If the calculated loss exceeds a threshold, parameters of the machine learning model 212 can be adjusted, and the video sequences 202 in the training data can be processed again (or new video sequences 202 in different training data can be processed) using the updated machine learning model 212 in order to produce new predicted emotions 214 that can be compared to ground truth data in order to calculate an updated loss. Ideally, the calculated loss decreases over time and eventually falls below the threshold, indicating that the machine learning model 212 has been trained to accurately (at least to within the desired accuracy represented by the threshold) predict the emotions of people in video sequences 202.

Note that the machine learning model 212 here may be trained to recognize a wide variety of human emotions in video content. In some embodiments, for example, the machine learning model 212 may be trained to recognize emotions that are arranged in a hierarchy, where two root categories of the hierarchy include positive emotions and negative emotions. As a particular example, the machine learning model 212 may be trained to recognize positive emotions of joy, surprise or astonishment, love, hope, and curiosity. For positive joy, the machine learning model 212 may be trained to recognize specific types of joy, such as humor or comedy, excitement, pride, and relief. For positive love, the machine learning model 212 may be trained to recognize specific types of love, such as romantic and platonic. For positive hope, the machine learning model 212 may be trained to recognize specific types of hope, such as faith and confidence. As another particular example, the machine learning model 212 may be trained to recognize negative emotions of sadness, anger, surprise or shock, arrogance, disgust, fear, jealousy, and suspicion. For negative sadness, the machine learning model 212 may be trained to recognize specific types of sadness, such as embarrassment, grief, and regret. For negative anger, the machine learning model 212 may be trained to recognize specific types of anger, such as frustration, argument, and rage. For negative fear, the machine learning model 212 may be trained to recognize specific types of fear, such as nervousness and horror. An ambiguous classification may also be supported to identify emotions that might be positive or negative, such as surprise or startled, confusion, and sarcasm.

In order to support this or other type of hierarchical arrangement of possible emotions, an adequate amount of training data can be used during the training process in order to effectively train the machine learning model 212 on how to identify these emotions and differentiate between similar emotions. This may involve the use of a very large training dataset, possibly including a training dataset having hundreds of thousands or more of video sequence training samples and associated ground truth data. This type of training dataset may be obtained in any suitable manner. In some cases, for instance, this type of training dataset may be obtained by automatically extracting video sequences containing facial expressions (such as from SAMSUNG TV PLUS owned and operated or "O&O" video channels or the YOUTUBE 8M dataset or other public/private datasets) and having humans manually annotate the extracted video sequences with ground truth labels identifying the actual emotions in the extracted video sequences. Also, in some cases, each of the video sequences 202 in the training dataset may be relatively short, such as when each of the video sequences 202 is about six seconds in length or less (although other suitable durations may be used).

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, the functions shown in or described with respect to FIG. 2 can be performed using a single device or multiple devices.

Although FIG. 2 illustrates one example of an architecture 200 supporting multi-modal understanding of emotions in video content, various changes may be made to FIG. 2. For example, various components and functions in FIG. 2 may be combined, further subdivided, replicated, or rearranged according to particular needs. Also, one or more additional components and functions may be included if needed or desired.

Figure 3:
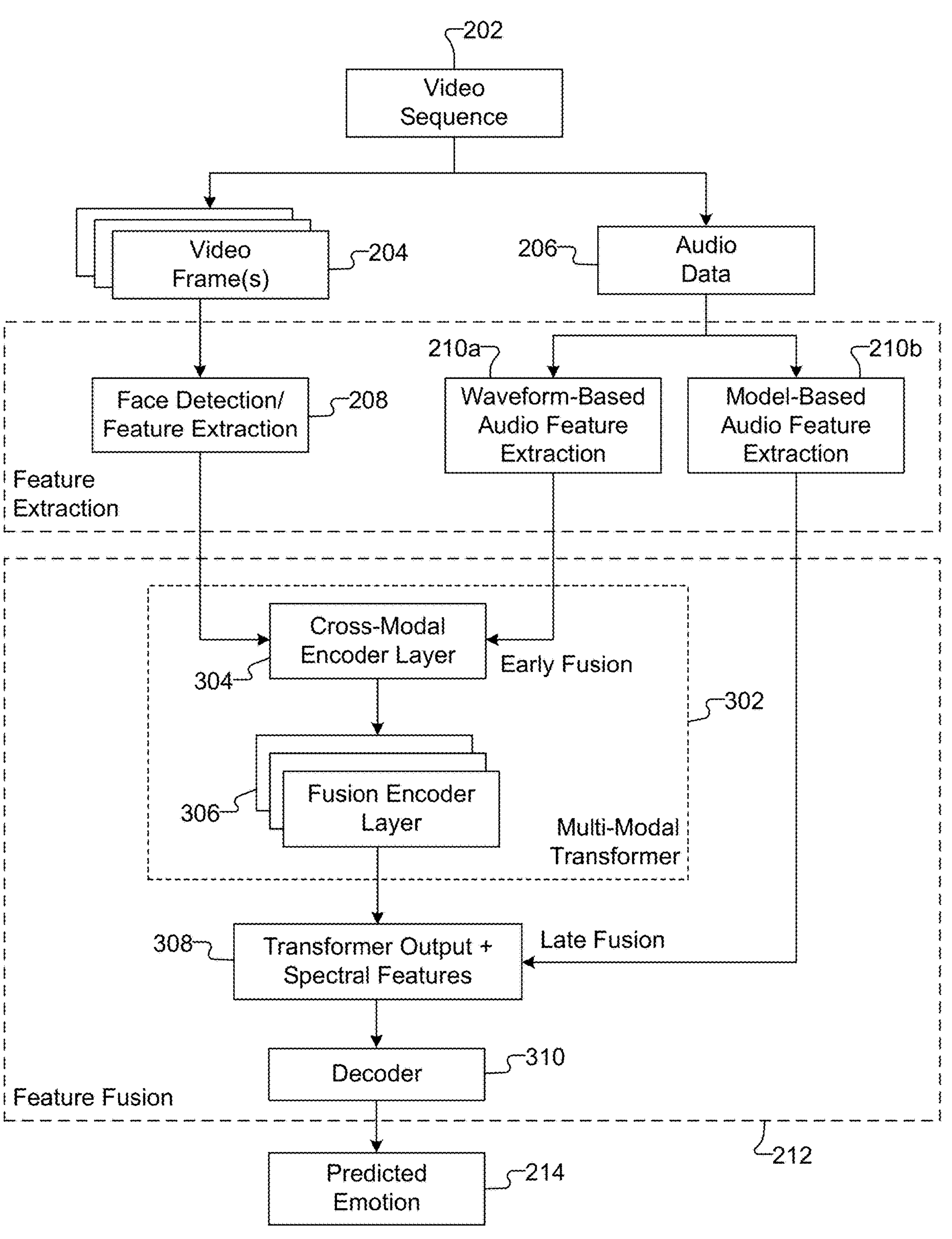
FIGS. 3 through 5 illustrate example machine learning models for use in the architecture of FIG. 2 in accordance with this disclosure.
Figure 4:
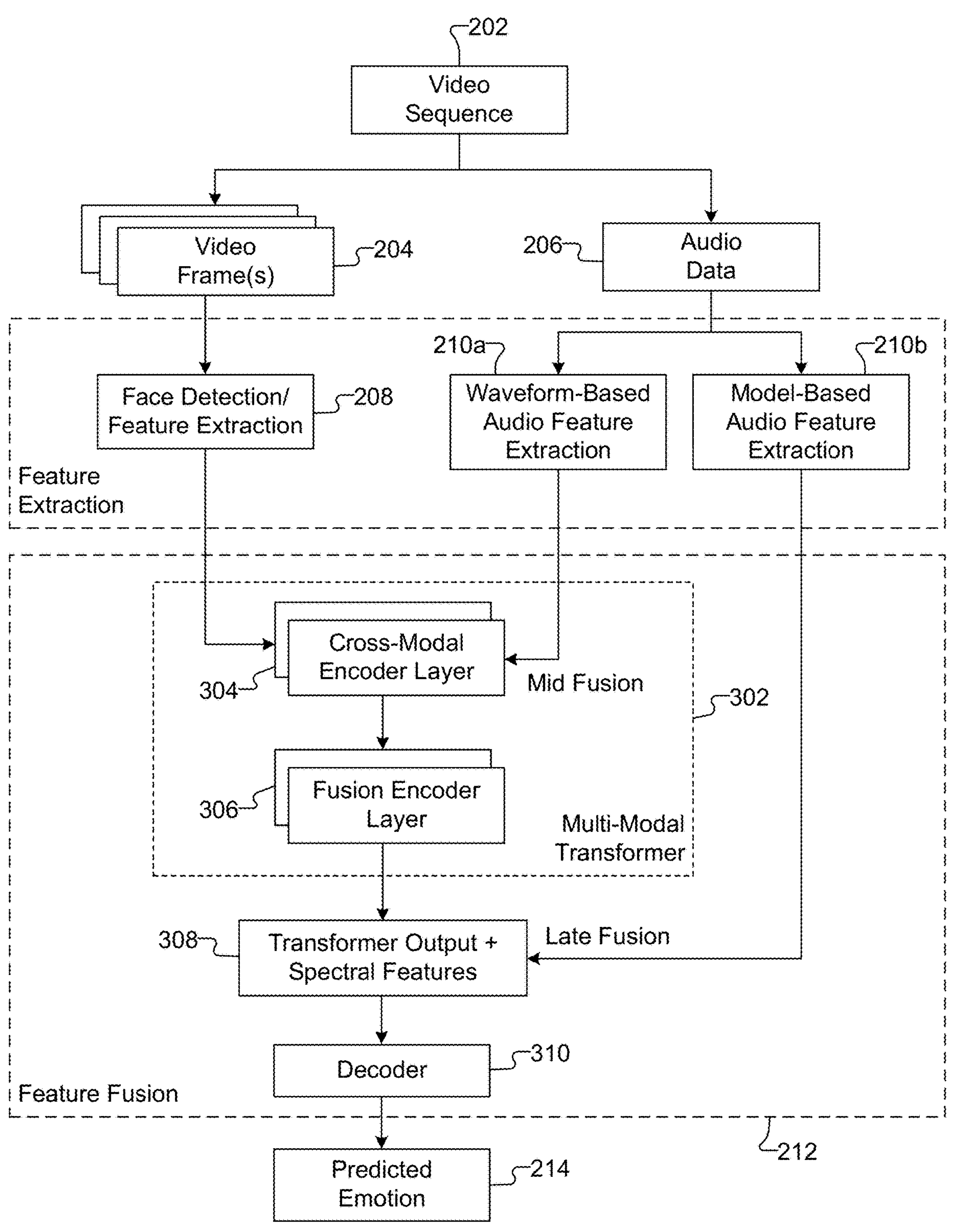
Figure 5:
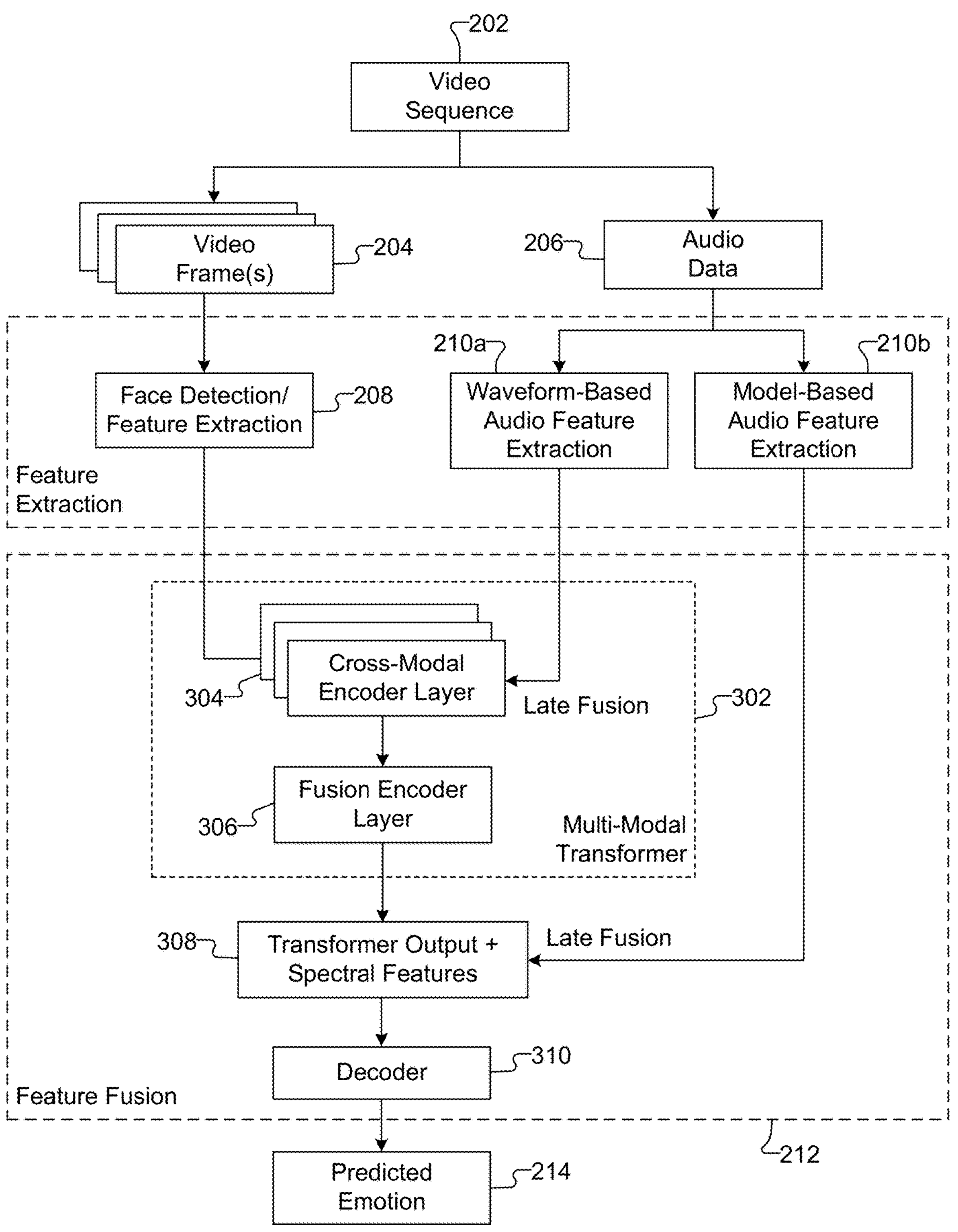

FIGS. 3 through 5 illustrate example machine learning models 212 for use in the architecture 200 of FIG. 2 in accordance with this disclosure. As shown in FIGS. 3 through 5, in some embodiments, the audio feature extraction function 210 may be implemented using separate audio feature extraction functions **210*a*-210*b*. The audio feature extraction function 210*a* may be used to identify general features of the raw audio waveforms in the audio data 206, such as energy-related, spectral-related, or other features of the audio data 206. In some cases, the audio feature extraction function 210*a* may be implemented using PyAudio analysis. The audio feature extraction function 210*b* may be used to identify features of the audio data 206 using a pre-trained audio model. In some cases, the audio feature extraction function 210*b*** may be implemented using a PSLA model.

In combination with the MTCNN/SCN or other implementations of the face detection and video feature extraction function 208, the architecture 200 can perform efficient feature extraction for multiple modalities, namely visual (faces) and audio, using a combination of state-of-the-art pre-trained machine learning models in individual domains. In particular embodiments, the face detection and video feature extraction function 208 can generate feature vectors having 512 dimensions, the audio feature extraction function **210*a* can generate feature vectors having 68 dimensions, and the audio feature extraction function 210*b*** can generate feature vectors having 527 dimensions. Note, however, that these values are examples only and can vary as needed or desired.

In the examples of FIGS. 3 through 5, the trained machine learning model 212 is implemented using an attention-based transformer architecture. Here, the trained machine learning model 212 includes a multi-modal transformer 302, which is implemented using one or more cross-modal transformer encoder layers 304 and one or more fusion encoder layer 306. The one or more cross-modal transformer encoder layers 304 can (among other things) receive and fuse the video features as determined by the face detection and video feature extraction function 208 and the first subset of audio features as determined by the audio feature extraction function **210*a*. For instance, the video features and the first subset of audio features may be concatenated or otherwise combined, and the resulting combined features can be processed by the one or more cross-modal transformer encoder layers 304. The one or more cross-modal transformer encoder layers 304 are responsible for encoding the combined video and audio features into a suitable form for subsequent processing. As a result, the one or more cross-modal transformer encoder layers 304 can produce processed features, which are based on the fusion of the video features and the first subset of audio features. In some embodiments, each of the one or more cross-modal transformer encoder layers 304** may include a self-attention mechanism and a feedforward network.

The processed features from the one or more cross-modal transformer encoder layers 304 represent multi-modal features since they are formed using combinations of video and audio features. Here, the multi-modal features are provided to the one or more fusion encoder layers 306, which can encode the multi-modal features from the cross-modal transformer encoder layer(s) 304. For example, the one or more fusion encoder layers 306 may be used to learn relationships between various multi-modal features when identifying emotions in video content. This allows the machine learning model 212 to learn how to relate various multi-modal features that are based on video and audio features with one another.

Outputs from the one or more fusion encoder layers 306 can represent the final outputs of the multi-modal transformer 302. As shown here, these outputs are fused (such as via concatenation) with a second subset of audio features as determined by the audio feature extraction function **210*b* via a fusion function 308. The resulting fused values are provided to a decoder 310, which decodes the fused features produced by the fusion function 308. For example, the decoder 310 can represent at least a portion of a machine learning model that has been trained to combine fused features in a manner that results in the generation of one or more predicted emotions 214 for a video sequence 202. In some cases, for instance, the decoder 310 may be implemented as a multi-layer perceptron (MLP) layer, which may include an input layer that receives the fused features, hidden layers that collectively process the fused features using (among other things) nonlinear activation functions, and an output layer that provides the one or more predicted emotions 214 based on outputs from the final hidden layer. As a particular example, the decoder 310** may be implemented as a multi-layer perceptron layer having one hundred hidden layers.

Overall, the illustrated embodiments of the machine learning model 212 can adapt a transformer model to learn temporal relations in unimodal features by working on cross-modal inputs along with feature fusion techniques. The embodiments of the machine learning model 212 shown in FIGS. 3 through 5 differ in how the fusions of the video and audio features are performed. For example, as shown in FIG. 3, there may be a single cross-modal transformer encoder layer 304 that receives and combines the video features and the first subset of audio features, along with multiple (such as three) fusion encoder layers 306 that process the outputs of the cross-modal transformer encoder layer 304. This type of approach may be said to represent an "early-late" fusion technique since the video and audio features are fused earlier in the layers of the multi-modal transformer 302 and later prior to the decoder 310. As shown in FIG. 4, there may be multiple (such as two) cross-modal transformer encoder layers 304 that receive and combine the video features and the first subset of audio features, along with multiple (such as two) fusion encoder layers 306 that process the outputs of the cross-modal transformer encoder layers 304. This type of approach may be said to represent a "mid-late" fusion technique since the video and audio features are fused closer to the middle layers of the multi-modal transformer 302 and later prior to the decoder 310. As shown in FIG. 5, there may be multiple (such as three) cross-modal transformer encoder layers 304 that receive and combine the video features and the first subset of audio features, along with a single fusion encoder layer 306 that processes the outputs of the cross-modal transformer encoder layers 304. This type of approach may be said to represent a "late-late" fusion technique since the video and audio features are fused later in the layers of the multi-modal transformer 302 and later prior to the decoder 310.

Although FIGS. 3 through 5 illustrate examples of machine learning models 212 for use in the architecture 200 of FIG. 2, various changes may be made to FIGS. 3 through 5. For example, various components and functions in each of FIGS. 3 through 5 may be combined, further subdivided, replicated, or rearranged according to particular needs. Also, one or more additional components and functions may be included in each of FIGS. 3 through 5 if needed or desired. In addition, the machine learning model 212 in the architecture 200 may have any other suitable form.

An architecture supporting the ability to effectively identify emotions in video content can be used to support any number of possible applications. The following represent example use cases where effectively identifying emotions in video content can be used. These use cases include social platform engagement, "living" art generation, advertisement targeting, metaverse emotion understanding, and content recommendation. Note, however, that these use cases are examples only and that the architecture 200 may be used in any other suitable manner for any other suitable purpose.

With respect to social platform engagement, one specific application may be to use the ability to identify emotions in video content in order to create a "sentiment-based" sentence generator, which may be used to engage with viewers of the video content. For example, the sentence generator can use the identification of emotions in video content being presented to viewers in order to generate coherent sentences and engage in conversations with the viewers. As a particular example, during an exciting sporting event, the architecture 200 may be used to sense "nervousness," and the sentence generator may produce engaging sentences such as "This is a nail-biting moment!"

With respect to "living" art generation, one specific application may be to generate "living" artwork that varies based on the emotions of people viewing the artwork. For example, one or more cameras may be used to capture video sequences of audience members viewing the artwork, and the architecture 200 can be used to identify the emotions of the audience members. The contents of the artwork can be changed based on the detected emotions, such as by changing the artwork based on the emotions of the viewers in front or closest to the artwork.

With respect to advertisement targeting, one specific application may be to target appropriate users and show them relevant advertisements based on the users' watch histories of video content. For example, advertisers can target specific users' interests based on taste graphs, and emotional categories of video content watched or preferred by the users can be included in the taste graphs. This can help to increase the precision of advertisement targeting. Thus, the architecture 200 can be used to identify the emotions in video content watched by specific users, and users' preferences in terms of emotional content in the watched videos can be included in the taste graphs. The architecture 200 can also be used to identify the emotions in specific advertisements. This allows matching of fine-grained categories between advertising content and user histories, which allows emotions to be a useful component when determining advertisement relevance scores and providing specific advertisements to specific users.

With respect to metaverse emotion understanding, the ability to understand emotions displayed by realistic human avatars in a metaverse can be used in various specific applications. For example, the architecture 200 may be used to identify the emotions in video content that users are watching and project those emotions onto the faces of the human avatars (such as by projecting the emotions of content onto facial keypoints of the avatars), thereby making the avatars behave more humanlike. The architecture 200 may be used to detect emotions of human-like avatars in the metaverse, and these detected emotions can be used to model sentence generation for metaverse conversations. The architecture 200 may be used to regulate extreme emotions in a metaverse for human-like avatars, such as when actions of a human-like avatar are restricted or otherwise regulated in response to the detection of "rage" or other specific emotion associated with that avatar (in order to avoid extreme behaviors).

With respect to content recommendation, one specific application may be to suggest video content to viewers based on, for instance, current videos being watched by the viewers and the viewers' watch histories or user profiles. For example, emotional profiles of viewers can be created using the architecture 200 based on the video content watched by the viewers over time. Videos that are high on certain emotions that viewers do not prefer can be removed from those viewers' recommendations. As a particular example, if someone tends to like only positive joyful shows or movies, a recommendation system may avoid recommending videos having "negative" as a major emotion to that viewer.

Figure 6:
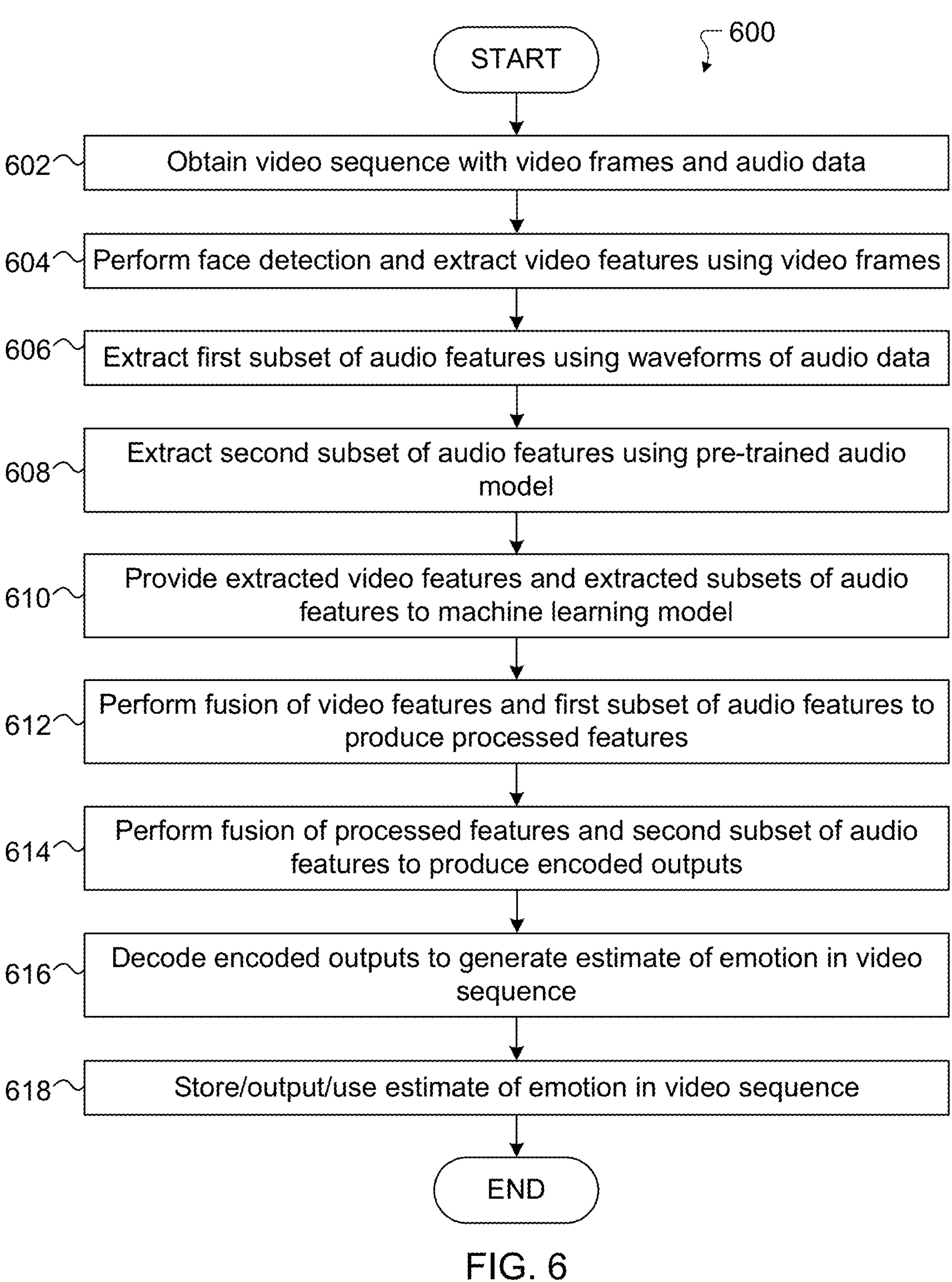
FIG. 6 illustrates an example method for multi-modal understanding of emotions in video content in accordance with this disclosure.

FIG. 6 illustrates an example method 600 for multi-modal understanding of emotions in video content in accordance with this disclosure. For ease of explanation, the method 600 shown in FIG. 6 is described as being performed by the electronic device 101 in the network configuration 100 of FIG. 1. However, the method 600 shown in FIG. 6 could be used with any other suitable device(s) and in any other suitable system(s), such as when the method 600 is performed by the server 106.

As shown in FIG. 6, a video sequence is obtained at step 602. This may include, for example, the processor 120 of the electronic device 101 obtaining the video sequence 202 from any suitable source. The video sequence 202 includes multiple video frames 204 and audio data 206, such as data defining audio waveforms. Face detection is performed and video features are extracted using the video frames at step 604. This may include, for example, the processor 120 of the electronic device 101 performing the face detection and video feature extraction function 208 in order to identify locations containing people's faces in the video frames 204 and to extract facial features or other video features associated with the video frames 204 based on the face detection results. In some cases, the video frames 204 may be divided into collections of video frames 204, such as six-second collections or other collections of video frames 204, and each collection of video frames 204 may be processed by the face detection and video feature extraction function 208. Also, in some cases, the face detection may be performed using an MTCNN, and the feature extraction may be performed using an SCN.

A first subset of audio features is extracted from the audio data at step 606, and a second subset of audio features is extracted from the audio data at step 608. This may include, for example, the processor 120 of the electronic device 101 performing the at least one audio feature extraction function 210, 210*a*-210*b* in order to extract audio features associated with the audio data 206. In some cases, the first subset of audio features can be based on the audio waveforms defined by the audio data 206, and these features may be identified using PyAudio analysis or other suitable signal analysis. Also, in some cases, the second subset of audio features can be determined using a pre-trained audio model, such as a PSLA model.

The extracted video features and the extracted subsets of audio features are provided to a trained machine learning model at step 610. This may include, for example, the processor 120 of the electronic device 101 providing the video features and the first subset of audio features to the multi-modal transformer 302 and providing the second subset of audio features to the fusion function 308. The trained machine learning model is used to perform a fusion of the video features and the first subset of audio features at step 612. This may include, for example, the processor 120 of the electronic device 101 concatenating or otherwise combining the video features and the first subset of audio features and processing the fused features using one or more cross-modal transformer encoder layers 304 and one or more fusion encoder layers 306. Final outputs of the multi-modal transformer 302 may represent processed features that are based on the video features and the first subset of audio features.

A fusion of the processed features and the second subset of audio features is performed at step 614. This may include, for example, the processor 120 of the electronic device 101 performing the fusion function 308 to concatenate or otherwise combine the processed features and the second subset of audio features. Outputs of the fusion function 308 may represent encoded outputs that are based on the video features and both subsets of audio features. The encoded outputs are decoded to generate an estimate of at least one emotion of at least one person as contained in the video sequence at step 616. This may include, for example, the processor 120 of the electronic device 101 processing the encoded outputs using the decoder 310, such as an MLP decoder. The decoder 310 can use the fused outputs from the fusion function 308 to produce one or more predicted emotions 214 associated with the video sequence 202.

The at least one predicted emotion can be stored, output, or used in some manner at step 618. The exact usage of the one or more predicted emotions 214 can vary based on the circumstances. Example applications (such as social platform engagement, "living" art generation, advertisement targeting, metaverse emotion understanding, and content recommendation) are described above, although the one or more predicted emotions 214 may be used in any other suitable manner for any other suitable purpose.

Although FIG. 6 illustrates one example of a method 600 for multi-modal understanding of emotions in video content, various changes may be made to FIG. 6. For example, while shown as a series of steps, various steps in FIG. 6 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining a video sequence comprising multiple video frames and audio data;

extracting video features associated with at least one face in the video frames by splitting the video frames into multiple collections of video frames and processing the collections of video frames using a multi-task cascaded convolutional network (MTCNN) to perform face detection and facial landmark alignment and a self-cure network (SCN) to identify the video features;

extracting audio features associated with the audio data; and processing the video features and the audio features using a trained machine learning model, the trained machine learning model performing a multi-tiered fusion of the video features and different subsets of the audio features in order to identify at least one emotion expressed by at least one person in the video sequence.

2. The method of claim 1, wherein:

extracting the video features comprises (i) performing face detection in the collections of video frames and (ii) processing the collections of video frames based on results of the face detection in order to identify the video features associated with the at least one face; and extracting the audio features comprises (i) processing the audio data in order to identify a first subset of the audio features associated with waveforms of the audio data and (ii) processing the audio data using a pre-trained audio model in order to identify a second subset of the audio features.

3. The method of claim 2, wherein processing the audio data using the pre-trained audio model comprises processing the audio data using a pretraining, sampling, labeling, and aggregation (PSLA) model.

4. The method of claim 1, wherein the trained machine learning model comprises:

at least one cross-modal transformer encoder layer configured to receive and fuse the video features and a first subset of the audio features and generate multi-modal features;

at least one fusion encoder layer configured to combine the multi-modal features; and a multi-layer perceptron (MLP) decoder layer configured to decode outputs of the at least one fusion encoder layer as fused with a second subset of the audio features.

5. The method of claim 1, wherein:

the trained machine learning model comprises a multi-modal transformer, the multi-modal transformer comprising one or more cross-modal transformer encoder layers and one or more fusion encoder layers;

outputs of the multi-modal transformer are fused with a second subset of the audio features; and the video features and a first subset of the audio features are fused by one of:

an earlier layer in the multi-modal transformer to support an early-late fusion of the video features and the audio features;

a later layer in the multi-modal transformer to support a late-late fusion of the video features and the audio features; or a layer between the earlier and later layers in the multi-modal transformer to support a mid-late fusion of the video features and the audio features.

6. The method of claim 1, wherein the multi-tiered fusion of the video features and the audio features comprises:

a first fusion of the video features and a first subset of the audio features; and a second fusion of processed features and a second subset of the audio features, the processed features based on the first fusion.

7. The method of claim 1, wherein the trained machine learning model is trained to recognize multiple emotions arranged in a hierarchy, two root categories of the hierarchy comprising positive emotions and negative emotions.

8. An electronic device comprising:

at least one memory configured to store a video sequence comprising multiple video frames and audio data; and at least one processing device configured to:

extract video features associated with at least one face in the video frames and audio features associated with the audio data; and process the video features and the audio features using a trained machine learning model, the trained machine learning model configured to perform a multi-tiered fusion of the video features and different subsets of the audio features in order to identify at least one emotion expressed by at least one person in the video sequence;

wherein, to extract the video features, the at least one processing device is configured to split the video frames into multiple collections of video frames and process the multiple collections of video frames using a multi-task cascaded convolutional network (MTCNN) to perform face detection and facial landmark alignment and a self-cure network (SCN) to identify the video features.

9. The electronic device of claim 8, wherein:

to extract the video features, the at least one processing device is configured to (i) perform face detection in the collections of video frames and (ii) process the collections of video frames based on results of the face detection in order to identify the video features associated with the at least one face; and to extract the audio features, the at least one processing device is configured to (i) process the audio data in order to identify a first subset of the audio features associated with waveforms of the audio data and (ii) process the audio data using a pre-trained audio model in order to identify a second subset of the audio features.

10. The electronic device of claim 9, wherein, to process the audio data using the pre-trained audio model, the at least one processing device is configured to process the audio data using a pretraining, sampling, labeling, and aggregation (PSLA) model.

11. The electronic device of claim 8, wherein the trained machine learning model comprises:

at least one cross-modal transformer encoder layer configured to receive and fuse the video features and a first subset of the audio features and generate multi-modal features;

at least one fusion encoder layer configured to combine the multi-modal features; and a multi-layer perceptron (MLP) decoder layer configured to decode outputs of the at least one fusion encoder layer as fused with a second subset of the audio features.

12. The electronic device of claim 8, wherein:

the trained machine learning model comprises a multi-modal transformer, the multi-modal transformer comprising one or more cross-modal transformer encoder layers and one or more fusion encoder layers;

the trained machine learning model is further configured to fuse outputs of the multi-modal transformer with a second subset of the audio features; and the trained machine learning model is configured to fuse the video features and a first subset of the audio features in one of:

an earlier layer in the multi-modal transformer to support an early-late fusion of the video features and the audio features;

a later layer in the multi-modal transformer to support a late-late fusion of the video features and the audio features; or a layer between the earlier and later layers in the multi-modal transformer to support a mid-late fusion of the video features and the audio features.

13. The electronic device of claim 8, wherein the multi-tiered fusion of the video features and the audio features comprises:

a first fusion of the video features and a first subset of the audio features; and a second fusion of processed features and a second subset of the audio features, the processed features based on the first fusion.

14. The electronic device of claim 8, wherein the trained machine learning model is trained to recognize multiple emotions arranged in a hierarchy, two root categories of the hierarchy comprising positive emotions and negative emotions.

15. A non-transitory computer readable medium containing instructions that when executed cause at least one processor to:

obtain a video sequence comprising multiple video frames and audio data;

extract video features associated with at least one face in the video frames and audio features associated with the audio data; and process the video features and the audio features using a trained machine learning model, the trained machine learning model configured to perform a multi-tiered fusion of the video features and different subsets of the audio features in order to identify at least one emotion expressed by at least one person in the video sequence;

wherein the instructions that when executed cause the at least one processor to extract the video features comprise instructions that when executed cause the at least one processor to split the video frames into multiple collections of video frames and process the multiple collections of video frames using a multi-task cascaded convolutional network (MTCNN) to perform face detection and facial landmark alignment and a self-cure network (SCN) to identify the video features.

16. The non-transitory computer readable medium of claim 15, wherein:

the instructions that when executed cause the at least one processor to extract the video features comprise instructions that when executed cause the at least one processor to (i) perform face detection in the collections of video frames and (ii) process the collections of video frames based on results of the face detection in order to identify the video features associated with the at least one face; and the instructions that when executed cause the at least one processor to extract the audio features comprise instructions that when executed cause the at least one processor to (i) process the audio data in order to identify a first subset of the audio features associated with waveforms of the audio data and (ii) process the audio data using a pre-trained audio model in order to identify a second subset of the audio features.

17. The non-transitory computer readable medium of claim 16, wherein the instructions that when executed cause the at least one processor to process the audio data using the pre-trained audio model comprise instructions that when executed cause the at least one processor to process the audio data using a pretraining, sampling, labeling, and aggregation (PSLA) model.

18. The non-transitory computer readable medium of claim 15, wherein the trained machine learning model comprises:

at least one cross-modal transformer encoder layer configured to receive and fuse the video features and a first subset of the audio features and generate multi-modal features;

at least one fusion encoder layer configured to combine the multi-modal features; and a multi-layer perceptron (MLP) decoder layer configured to decode outputs of the at least one fusion encoder layer as fused with a second subset of the audio features.

19. The non-transitory computer readable medium of claim 15, wherein:

the trained machine learning model comprises a multi-modal transformer, the multi-modal transformer comprising one or more cross-modal transformer encoder layers and one or more fusion encoder layers;

the trained machine learning model is further configured to fuse outputs of the multi-modal transformer with a second subset of the audio features; and the trained machine learning model is configured to fuse the video features and a first subset of the audio features in one of:

an earlier layer in the multi-modal transformer to support an early-late fusion of the video features and the audio features;

a later layer in the multi-modal transformer to support a late-late fusion of the video features and the audio features; or a layer between the earlier and later layers in the multi-modal transformer to support a mid-late fusion of the video features and the audio features.

20. The non-transitory computer readable medium of claim 15, wherein the multi-tiered fusion of the video features and the audio features comprises:

a first fusion of the video features and a first subset of the audio features; and a second fusion of processed features and a second subset of the audio features, the processed features based on the first fusion.

* * * * *